May 20, 1924.　　　　　　　　　　　　　　　　　1,495,014
J. GALLOWAY
TYPE SETTING, PRINTING, AND DISTRIBUTING MACHINE
Filed Oct. 20, 1922　　　7 Sheets-Sheet 1

WITNESSES

INVENTOR
John Galloway
BY
ATTORNEYS

May 20, 1924.
J. GALLOWAY
TYPE SETTING, PRINTING, AND DISTRIBUTING MACHINE
Filed Oct. 20, 1922    7 Sheets-Sheet 2
1,495,014
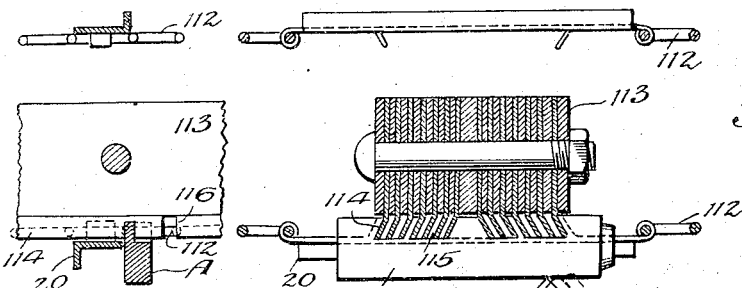
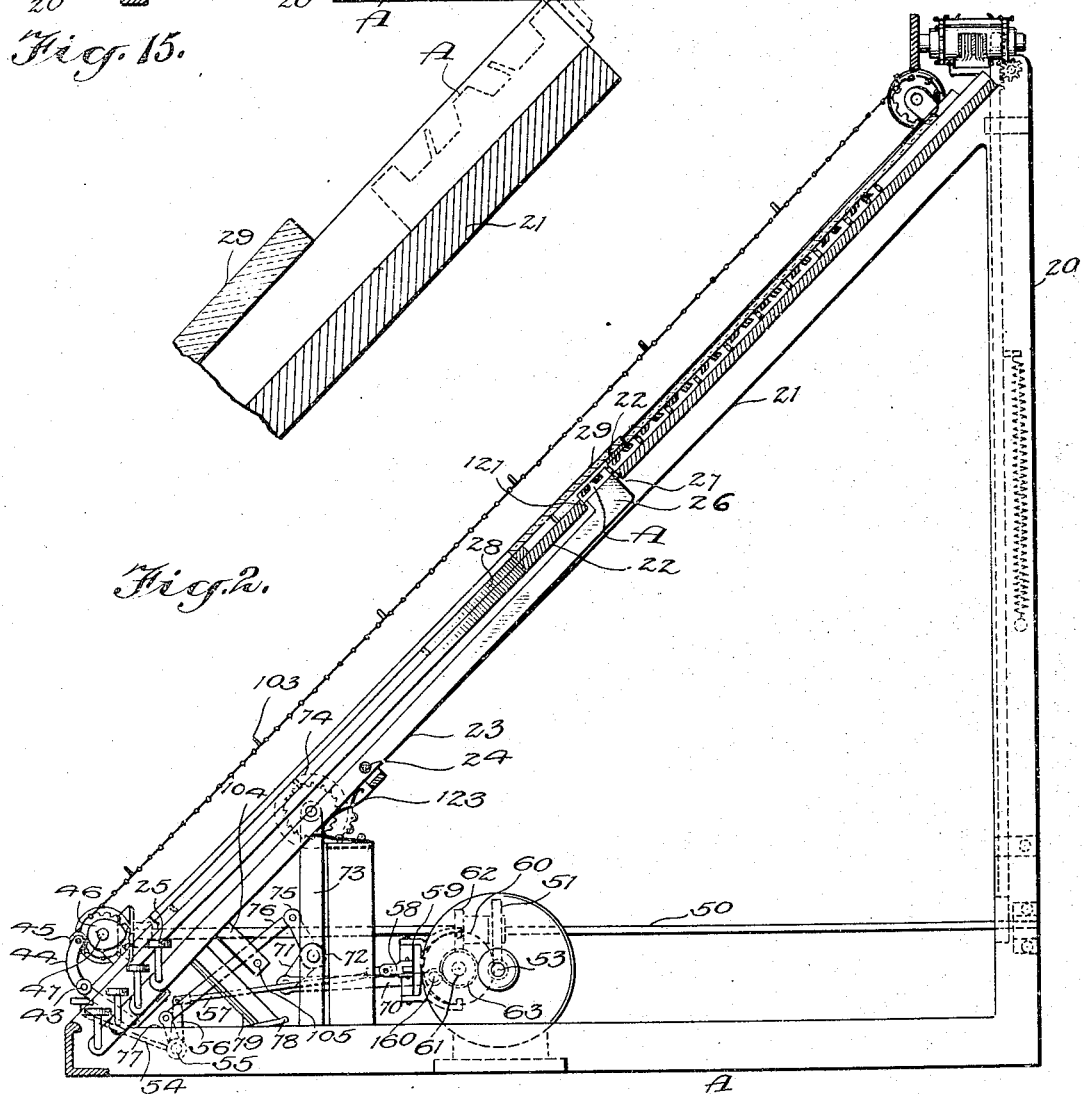
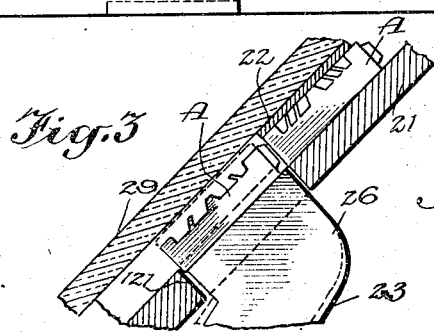
WITNESSES
INVENTOR
John Galloway
BY
ATTORNEYS May 20, 1924.
J. GALLOWAY
1,495,014
TYPE SETTING, PRINTING, AND DISTRIBUTING MACHINE
Filed Oct. 20, 1922　　7 Sheets-Sheet 3
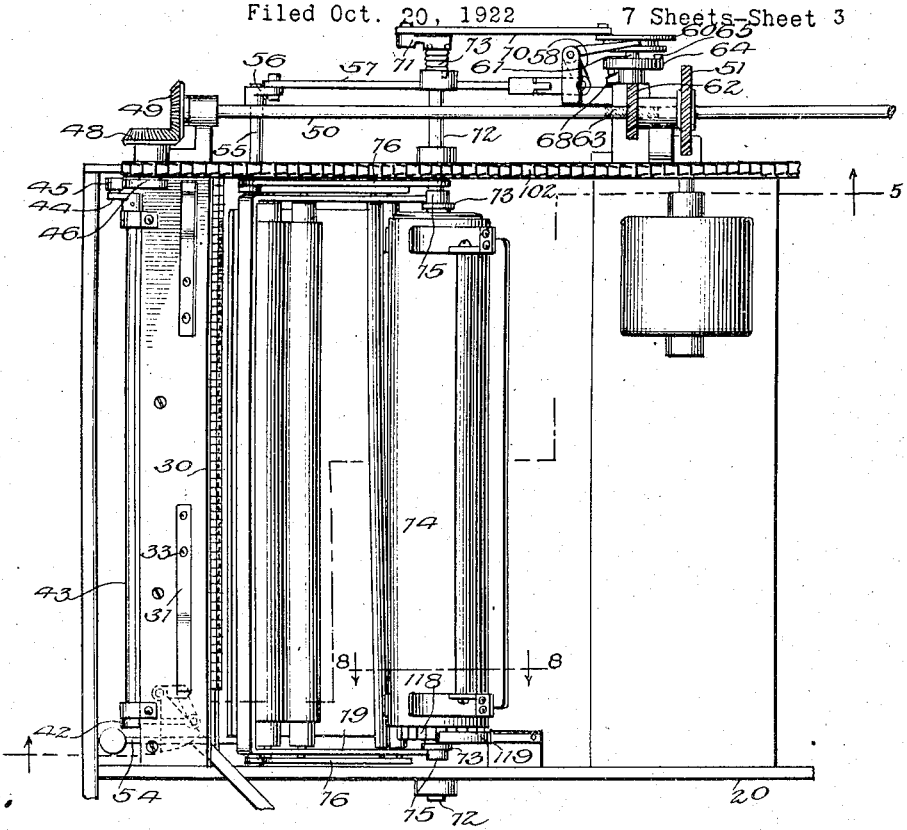
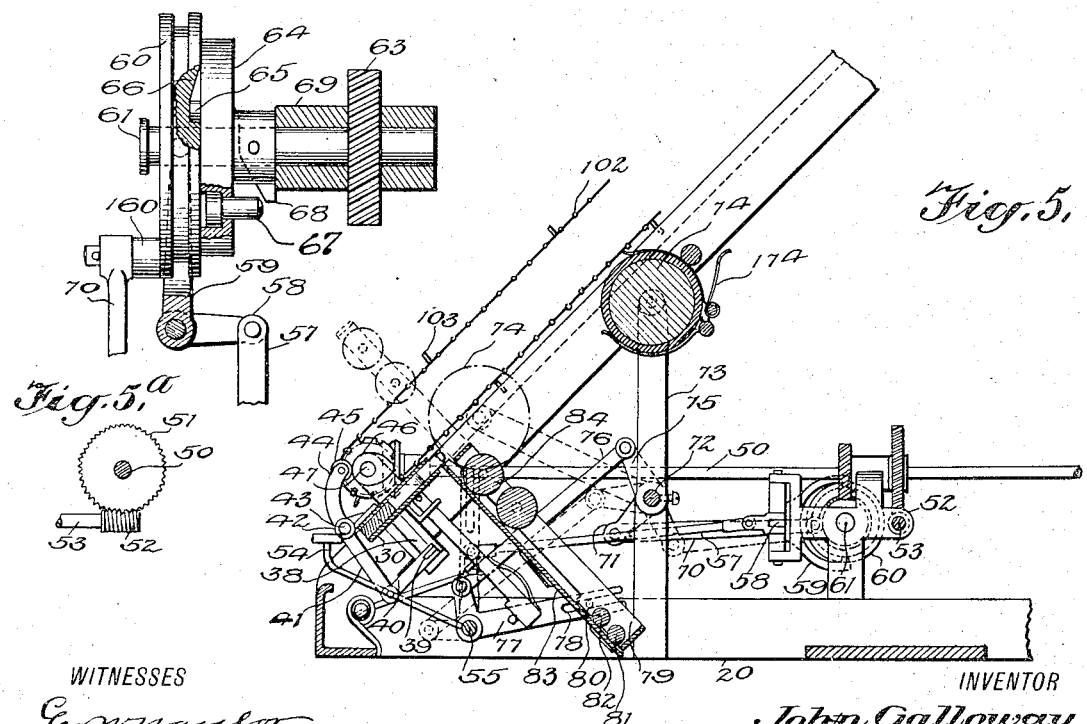
WITNESSES
INVENTOR
John Galloway
BY
ATTORNEYS May 20, 1924. 1,495,014
J. GALLOWAY
TYPE SETTING, PRINTING, AND DISTRIBUTING MACHINE
Filed Oct. 25, 1922 7 Sheets-Sheet 4

WITNESSES
INVENTOR
John Galloway
ATTORNEYS

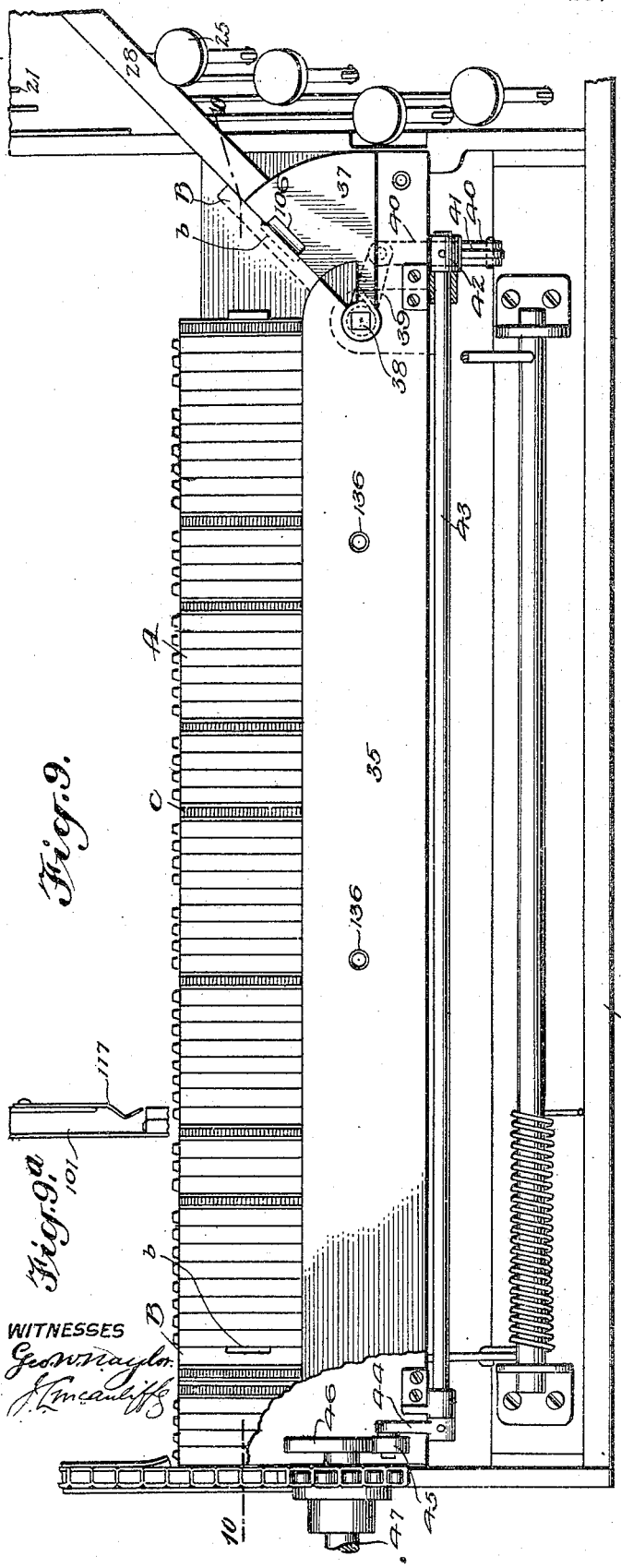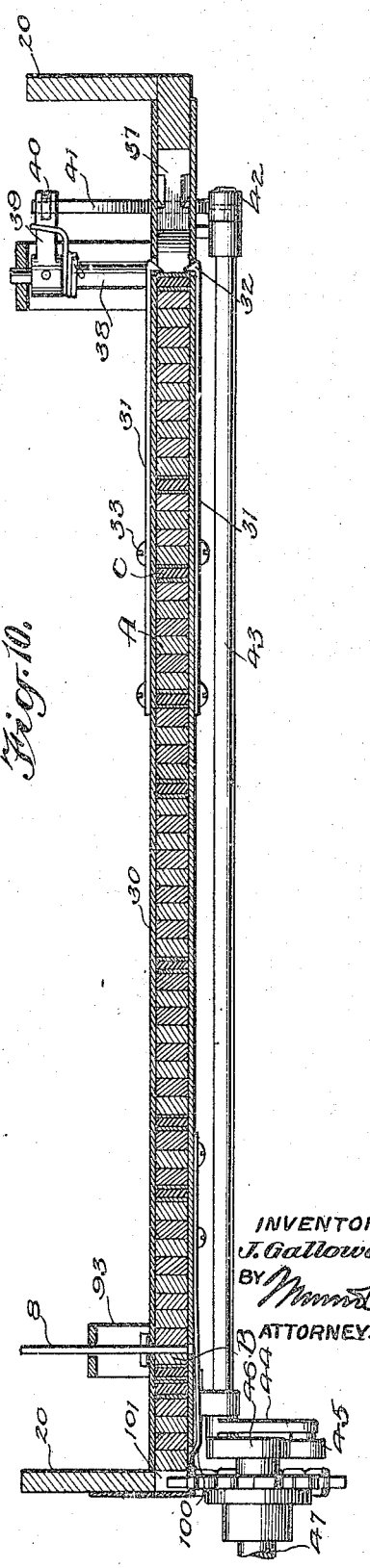

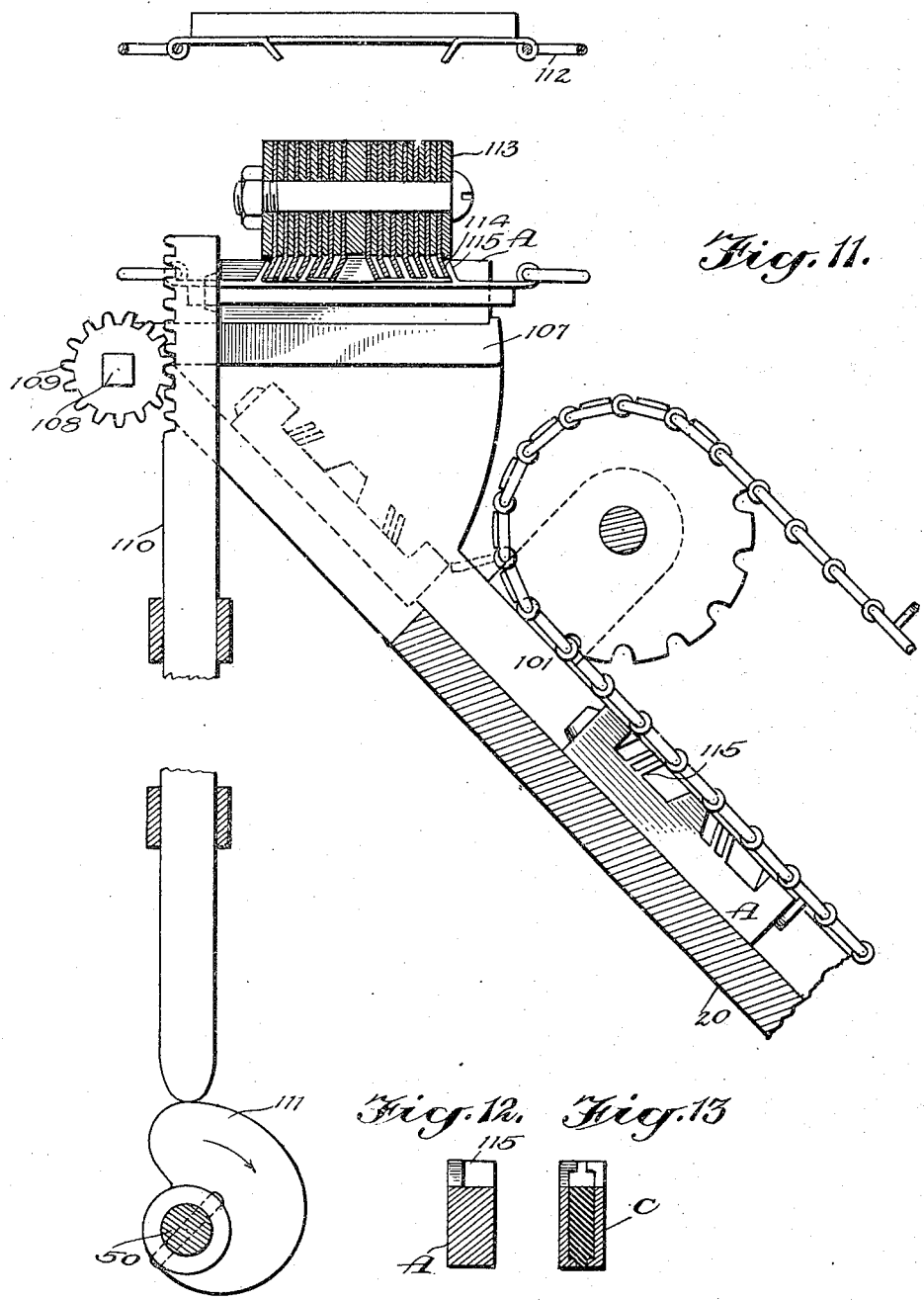

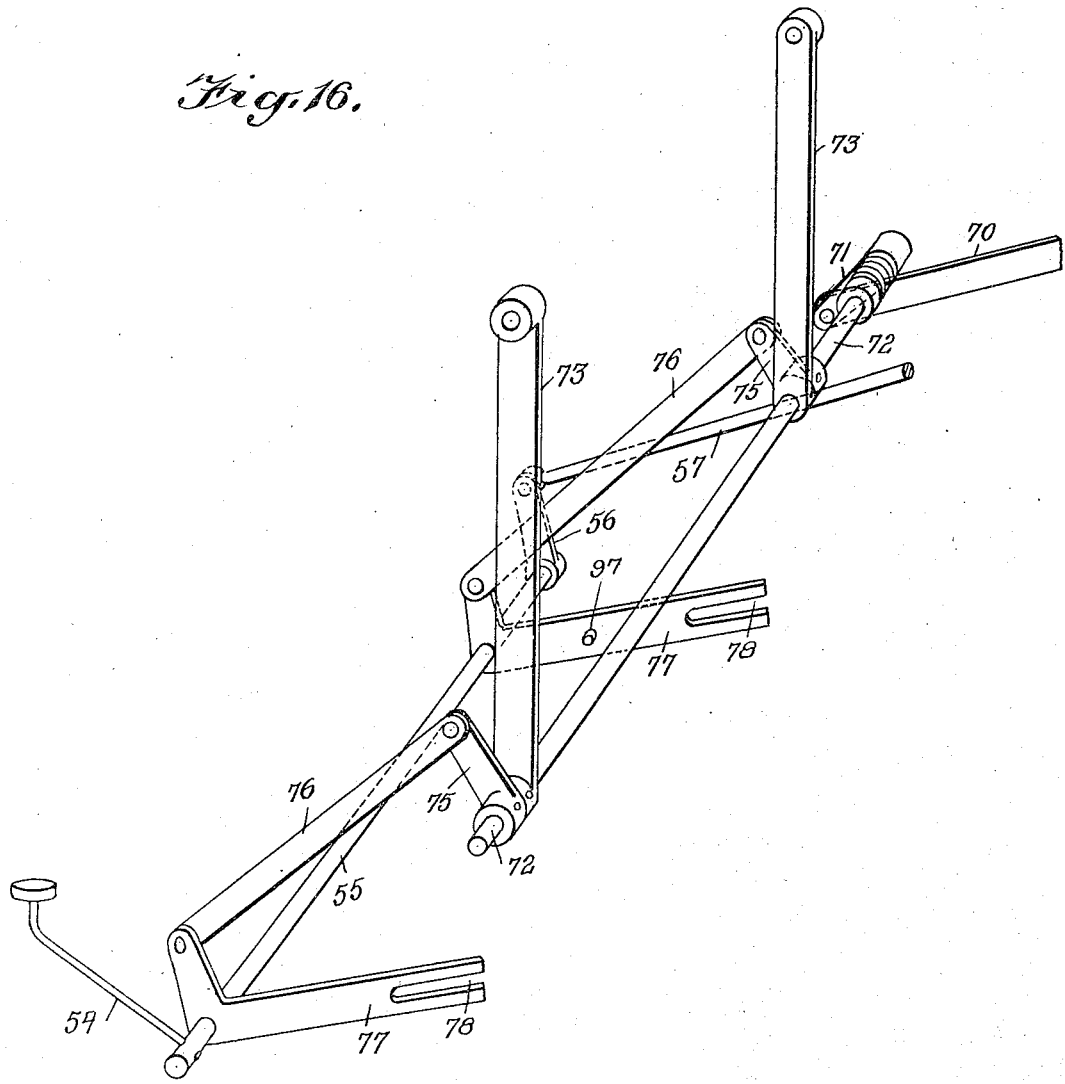

Patented May 20, 1924.

1,495,014

UNITED STATES PATENT OFFICE.

JOHN GALLOWAY, OF JERSEY CITY, NEW JERSEY.

TYPE SETTING, PRINTING, AND DISTRIBUTING MACHINE.

Application filed October 20, 1922. Serial No. 595,829.

*To all whom it may concern:*

Be it known that I, JOHN GALLOWAY, a citizen of the United States of America, and a resident of Jersey City, in the county of Hudson and State of New Jersey, have invented a new and Improved Type Setting, Printing, and Distributing Machine, of which the following is a description.

My invention relates to machines operated by a bank of keys after the manner of a typewriter and acting to selectively engage individual type and dislodge them from their respective stacks and direct them to a liner or form, hereinafter referred to as a form, in which the type are justified and held while the line is printed. The machine includes printing and inking mechanism brought into action by touching a key, the restoring of the printing platen after movement toward the line of type for printing the latter serving to release the line of type and the quads in single succession to an elevating and distributing mechanism that returns the type to the respective stacks.

The general object of my invention is to provide a machine of the indicated character operated after the manner of a typewriter by keys which machine will produce a printed page by line printing and having the characteristics of ordinary printing without the defects and undesirable peculiarities of typewriting.

An important object also is to provide a machine of the indicated character in which the inking and printing mechanism is key-controlled but power-operated, whereby the parts will be subject to mere touching of the key by the operator while insuring a positive operation of said mechanism.

A further object of the invention is to provide novel means for performing the various operations with precision so that the operations of type setting, inking, printing and distributing will proceed in order and unfailingly.

Reference is to be had to the accompanying drawings forming a part of this specification, it being understood that the drawings are merely illustrative of one example of the invention.

Figure 2 is a transverse vertical section as indicated by the line 2—2, Figure 1;

Figure 7:
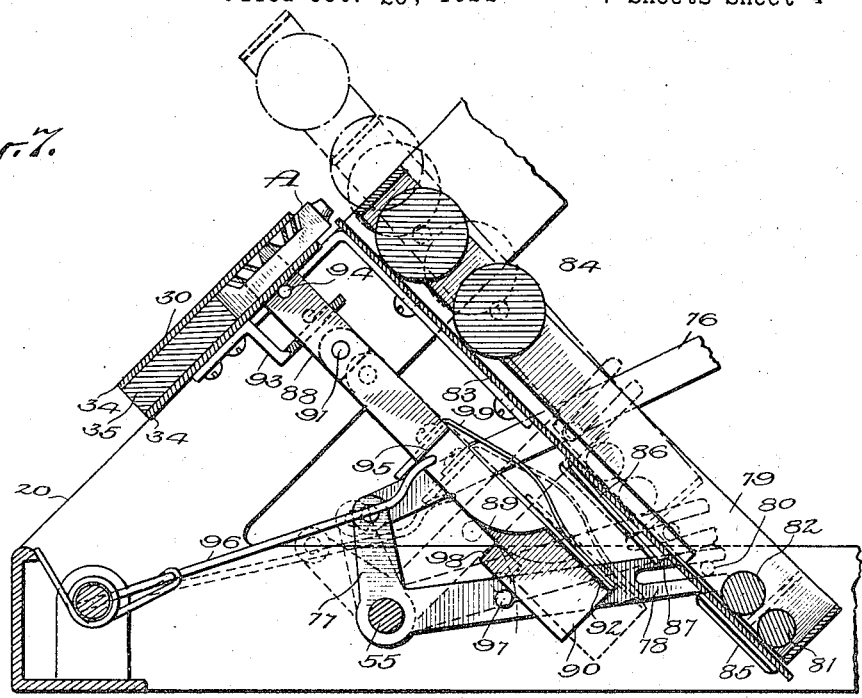
Figure 8:
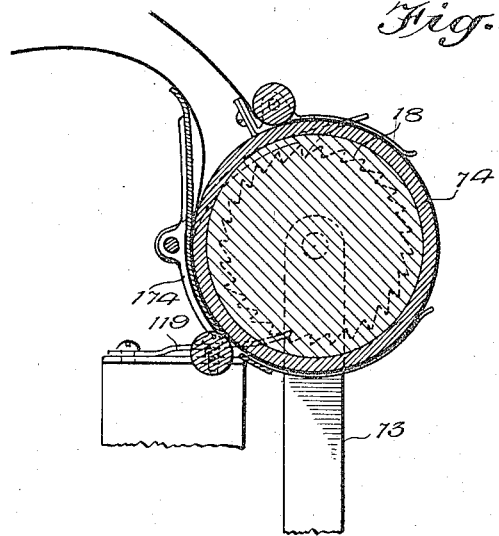

Figure 3 is an enlarged fragmentary view in vertical section given to show the action of the key-operated levers in selecting a type;

Figure 4 is an enlarged plan view of the lower portion of the machine at that side in which the line form and printing mechanism are located;

Figure 5 is a transverse vertical section as indicated by the line 5—5, Figure 4;

Figure 5ª is a detail of the drive means to be hereinafter referred to;

Figure 6 is a detail of means to throw the inking and printing mechanism into and out of action;

Figure 7 is a transverse vertical section through the inking and printing mechanism;

Figure 8 is a cross section through the printing platen and paper holding means appurtenant thereto;

Figure 9 is a partly sectional front view on an enlarged scale of the form in which the line is made up and showing adjacent parts;

Figure 9ª is a detail in longitudinal section of a portion of the elevator channel showing a yieldable guard element therein;

Figure 10 is a section on the line 10—10, Figure 9;

Figure 11 is an enlarged detail in vertical section of a portion of the elevating and distributing means;

Figure 12 is a cross section of the type employed in my machine;

Figure 13 is a horizontal section through the compressible quad or spacer;

Figure 14 is a vertical section similar to Figure 11 showing a detail of the distributing means;

Figure 15 is a detail of the distributing means at right angles to Figure 14;

Figure 16 is a perspective view of a link assemblage entering into the operation of the machine.

In carrying out my invention in accordance with the illustrated example a suitable frame 20 is provided having a multiplicity of channels 21 in which the individual type are stacked, said channels being disposed at an angle of approximately 45° to the vertical plane. In the channels 21 is a shoulder 121 against which the lowermost type A in each stack rests. Above the shoulder 121 is a transverse guard plate 22 extending across the respective channeds 21 to guide the type A in definite paths in the channels and prevent tilting of a type next to the lowermost one in the stack when the lowermost type is selected and displaced. The lowermost type beneath the plate is disposed in the channel 21 between the shoulder 121 and guard plate 22.

Figure 1:
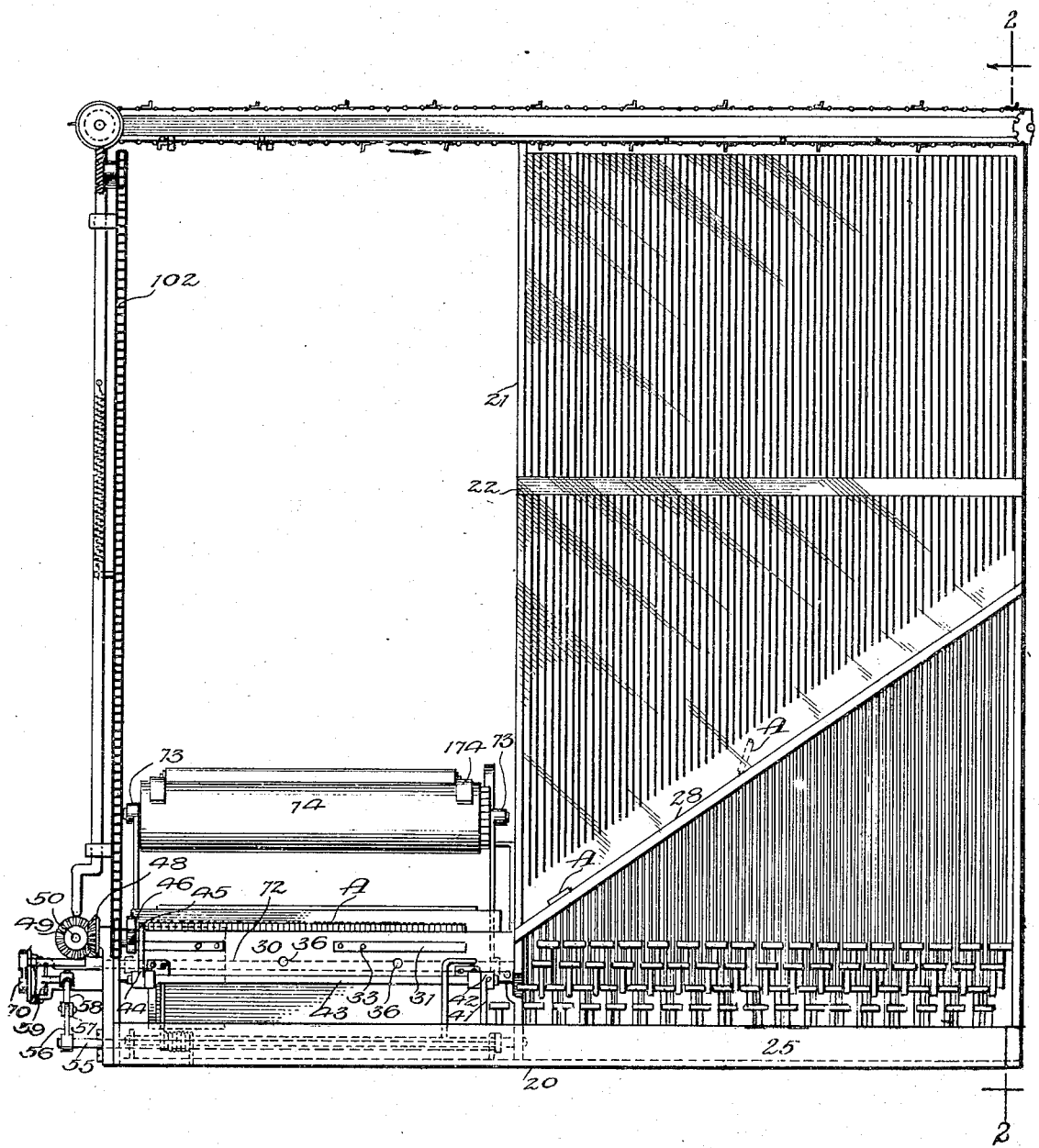
Figure 1 is a front elevation of a machine embodying my invention.

A series of levers 23 rock in a vertical plane being fulcrumed between their ends as at 24, the numeral 25 indicating a bank of keys on said levers. The upper ends of the levers 23 are upturned and operate in a slot 27 disposed beneath the lowermost type in each stack, the rocking of said levers 23 serving to cause the upturned ends 26 to lift the lowermost type of the stack over shoulder 121. When the type is lifted by the lever 23 to clear the shoulder 121 the type gravitates to an oblique chute 28 disposed below said shoulder as best seen in Figure 1. From the chute 28 the type A is delivered to the liner or form 30 in which the line of type is justified. Employed in connection with the type A are master quads B and spacing quads C, the former being fed at the beginning of each line of type as the line is set up as will appear. To opposite sides of the form 30 at the entrance end are resilient type restraining strips 31 having inturned catch heads 32 disposed across the entrance of the form 30 to retain the type as they are successively forced past said catches, 32. 33 indicates screws or other fasteners for the catch springs 31. The liner or form designated generally by the numeral 30 in which the line of type is made up, comprises side plates 34 (Figure 7) and a solid block or bottom portion 35 on which the type A rest in the form. The side plates are secured by screws 36 (Figure 1) which pass into screw holes 136 in the sides 34 and block 35.

For feeding the type into the form 30 as the type are received in succession from the chute 28 I provide a rockable type lift 37, Figures 9 and 10. On a rock shaft 38 which has an arm 39 connected by a link 40 is an arm 41 having a rigid hub 42 fast on a shaft 43 extending horizontally across the front of the machine below the form 30 to the opposite side of the machine. At the opposite side of the machine the shaft 43 has an arm 44, on which is a roller 45 disposed against the periphery of a cam 46 on a shaft 47 having a suitable drive connection with the motor shaft, there being shown a bevel pinion 48 on shaft 47 meshing with a similar pinion 49 on shaft 50 best seen in Figure 4. The shaft 50 has suitable drive connection with the motor shaft 53, there being shown a worm wheel 51 on shaft 50 meshing with a worm 52 (Figure 5ª) on motor shaft 53.

I have shown one means for throwing the inking and printing mechanism into action, it being understood that any suitable means to effect a drive connection with the motor shaft may be employed. In the illustrated example the key 54 is adapted to be pressed, said key being on a rock shaft 55 having at the opposite side of the machine an arm 56 connecting by a link 57 with a bellcrank 58, one arm of which constitutes a shift fork 59, said fork controlling peripherally grooved disk 60 loose on the motor shaft 61. The shaft 61 is continuously driven by the shaft 50 which itself, as stated, is driven by the motor shaft 53. Said shaft 50 has a spiral gear 62 meshing with a spiral gear 63 on the shaft 61. Fixed on the shaft 61 is a disk 64 having a lateral pin 65 adapted to enter a notch 66 in the disk 60 when the latter is thrown by the fork 59. The disk 60 is shifted in the reverse direction for disestablishing its drive connection with the disk 64 and shaft 61 by a pin 67 shiftable laterally in disk 64 and adapted to be engaged by a fixed cam 68 on bearing 69 of shaft 61. Thus, when the fork 59 establishes the drive connection between disk 60 and disk 64, the drive connection will be disestablished after one revolution by the cam 68 shifting the pin 67 laterally to restore the disk 60 to its original disconnected position on shaft 61.

A wrist pin 160 on disk 60 connects by a rod 70 with an arm 71 on a shaft 72. Rigid with the shaft 72 are frame elements 73 carrying the platen 74 in the form of a roller and having suitable paper holding means designated generally by the numeral 174. On the shaft 72 also near each end are arms 75 which connect by links 76 with the shorter arms of bellcrank levers 77, the longer arms of which are formed into forks 78 connecting with pins 80 on an obliquely disposed frame 79 carrying ink-distributing rollers 81, 82 and carrying also inking rollers 84 adapted to move over and ink the type in the form 30. The numeral 83 indicates the ink table over which the rollers 81, 82, 84 operate. In order to cause the inking rollers 84 to clear the type A in the form 30 on the return stroke, the frame 79 has a ledge 85 thereon beneath the table 83. At the under side of the table is a spring 86 secured on a bracket 87 which spring normally tends to lie at its free end close to the under side of table 83, that end of said spring 86 nearest the lower end of frame 79 being spaced from the table 83; the arrangement is such that the ledge 85 in the upward inking movement of frame 79 will pass over the spring 86, whereas on the return stroke of frame 79 the ledge 85 will pass beneath the spring 86 and by reason of the oblique disposition of said spring the frame 79 will be tilted to lift the inking rollers 84 into a plane to clear the type in form 30. In the rocking or tilting of the frame 79 the roller 82 which is slightly larger than the roller 81 acts as the center of movement.

In the printing of a line the type are locked through the medium of the master quad B which it will be observed from Figure 9 has a slot b in the side thereof into which slot a stop bar 88 is adapted to be protruded. Said bar is formed of two pivoted sections, the one terminating at 89 (Figure 7) and the other section 90 being pivoted to the first section at 91 and having a flange 92 resting on said section. Said bar 88 has guided movement in a bracket 93 on the form 30 and has a pin 94 limiting its forward movement by contacting with the adjacent side plate 34 of form 30. A shoulder 95 is formed in the stop bar 88 against which shoulder a spring 96 engages tending to throw the stop bar to the locking position in engagement with the master quad B. At the lower end the section 90 of stop bar 88 rests on a lateral pin 97 on the forked arm or bellcrank 77 and with the rocking of said bellcrank 77 pin 97 engages section 90 and rocks it on its pivot 91 so that there is no longitudinal movement given to the stop bar 88 which remains in engagement with the quad B. In the upward movement of the bellcrank lever 77, pin 97 passes beyond a shoulder 98 on stop bar section 90. A spring 99 secured to the stop bar section 88 at the shoulder 95 tends to restore the pivoted section 90 after a movement on the upstroke of pin 97. Said spring 99 also acts as a bumper against the ink table 83 to limit the movement of pivoted section 90. Upon the return stroke of the bellcrank lever 77 its pin 97 will engage shoulder 98 and cause the stop bar 88 to be withdrawn from engagement with the quad B thereby permitting said quad and type A in the form 30 to move in single succession out of form 30 as the type for the next line are fed in succession to said form. The continued downward movement of the bellcrank lever 77 will cause the pin 97 to slip from the shoulder 98 and permit the spring 96 to exert its pressure against the stop bar 88 in a direction tending to move said stop bar into slot b of the next end quad B arriving in line with said stop bar. To prevent tilting of the type at the discharge end of the form 30 I provide a friction spring bar 100, the curved end of which bears against a side of the foremost type. The pressure of the type being fed will overcome the pressure of the spring 100 and permit the type to move in succession into a channel 101 of an elevator having an endless chain 102, the lowermost run of which travels in said channel 101 and has flights or teeth 103 to engage the type and lift the same to the distributing means hereinafter described. To select a master quad B for the starting of the new line I provide means adapted to be manually or automatically actuated for which purpose use is made of trip means on the printing mechanism which will operate that key 23 controlling the stack of quads.

In Figure 2 it will be observed that a key 23 is shown with a depending hanger 104 having a lateral pin 105, said pin lying beneath the link 76 so that said link 76 as moved downwardly by the movement of shaft 72 and its arms 75 with the restoring of the platen 74 to its non-printing position, said link 76 will engage the pin 105 and draw down that link 23 provided with said pin, thus displacing the lowermost master quad in the stack permitting it to drop to chute 28 and to the type lifting element 37. The said element 37 has notches 106 in the sides thereof at the front edge so that the quad B thereon or a type A in being lifted by said element 37 will be forced past the catches 32 but the notches 106 will afford the element 37 clearance for the return movement of said element without engaging said catches 32. The chain 102 carries the discharged type to the top of the elevator channel 101 where it is received on a transfer arm 107 rigid on a rock shaft 108 having a pinion 109. Meshing with the pinion 109 is a reciprocating rack bar 110, the lower end of which rests on the periphery of a cam 111 fixed on the shaft 50. Thus, with each revolution of the shaft 50 a delivery and a return movement will be imparted to the transfer arm 107. From the transfer arm 107 the type A or quad is taken up by a horizontal chain 112, the lower run of which passes beneath a fixed selective bar 113 having a series of plates, the lower ends 114 of which constitute wards disposed in pairs and inclined toward each other after the manner of a dovetail, said wards 114 adapted to engage corresponding wards 115 on the type A. The wards 115 differ on each type A and the ward flanges 114 on the bar 113 have cut-outs 116 (see Figure 15) variously positioned along the bar 113, there being cut-outs 116 to correspond with the wards 115 of a given type and disposed above that channel 21 to which the particular type is to be delivered. Thus, when each type reaches its particular cut-outs 116 corresponding with the wards on that type, the type will drop to its proper channel as indicated in dotted lines in Figure 14, thereby completing the distribution of the type.

The spacing quads C shown in cross section in Figure 13 are composed each of side plates housing a resilient means permitting the sides to collapse. The quad C normally is of type width and is compressible to a width less than that of the type for justifying. The resilient internal means which may be a block of rubber or springs yielding to the pressure of additional quads C forced into the form 30 by the lift element 37.

In order to prevent the possibility of two types being carried side by side by the elevator chain 102 as might occur with types or quads of n width, I provide in the elevator channel 101 as shown in Figure 9ᵃ a laterally bent resilient guard 117 protruding into said channel laterally and affording clearance for one type while excluding a second type.

To bring about automatic line spacing the roller platen 74 has a ratchet 118 on the shaft thereof adapted to be engaged by a fixed pawl 119, the pawl being positioned to engage the ratchet upon each return movement of the platen.

By the described construction it will be seen that printing is produced similar to the work of a regular printing press, thereby avoiding the abnormal printing of typewriting machines, while at the same time the machine is controlled by the bank of keys operating by mere touch to control the operative mechanism in addition to selecting the type.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a machine of the class described, means to set and justify a line of type from separate and independent individual types, a power-operated printing means adapted to effect an impression of said type in the position in which the type is composed, and key-operated controlling means to bring said printing means into operation.

2. In a machine of the class described, a form for composed type, means to compose a line of type in said form, power-operated printing means adapted to print the line of type in the said form, and key-operated controlling means to bring said printing means into operation; together with means to automatically throw said printing means out of action in each printing operation.

3. In a machine of the class described, means to hold separate types, key-operated type-selecting means, a fixed form to which the selected separate and independent individual types are delivered, and means to hold the set-up line in said fixed form for printing.

4. In a machine of the class described, means to hold separate types, key-operated type-selecting means, a fixed form to which the selected types are delivered, and means to hold the set-up line in said fixed form for printing; together with line-printing means to print set-up lines in succession, said line printing means operative to produce an impression of said type while in said form.

5. In a machine of the class described, type-setting means, a form to which the types are separately delivered by said type-setting means and in which form the type is set by said setting means, driven printing means to produce an impression of the type while in said form, and key-operated means controlling said driven printing means.

6. In a machine of the class described, a holder containing separate and independent individual types a fixed form key-operated type-selecting means to set up in said fixed form a line from the selected independent types, and driven printing means to print the set-up line, said printing means operating to produce an impression of the type in the position in which the type is set.

7. In a machine of the class described, a holder containing separate and independent individual types key-operated type-selecting means, means to set up a line from the selected type, driven printing means to print the line in the position in which the line is set, and key-operated means controlling said printing means.

8. In a machine of the class described, a holder containing separate and independent individual types printing means, manually operable type-selecting means, a fixed form means to set up in said fixed form the selected independent type, printing means positioned to print the line without shifting the line, and manually operable means to optionally bring the printing means into operation.

9. In a machine of the class described, means to set up a line of separate type, and means to position a master quad in said line at the front end thereof.

10. In a machine of the class described, means to set up a line of separate type, and means to position a master quad in said line at the front end thereof; together with line-printing means manually operable means controlling the feed of a master quad for each line, and means operable by the printing means to actuate said manually operable controlling means.

11. A machine of the class described including type-selecting means, a fixed form, means to form the selected type set up in said form into a line, printing mechanism to print the line in the position in which it was set, a continuously operating driven shaft, and means to optionally throw the printing mechanism into drive connection with the driven shaft for printing the line.

12. A machine of the class described including means to set up a line of type, line-printing mechanism, and means operated by the printing mechanism to release the type in the line after printing.

13. A machine of the class described including means to set up a line of type, line-printing mechanism, and means operated by the printing mechanism to release the type in the line after printing; together with type-elevating and distributing means to which the type is discharged when released.

14. A machine of the class described including type-selecting means, means to form a line from the selected type, and type-conveying and distributing means, the type in the line being adapted to be displaced under the pressure of the incoming type of a new line.

15. A machine of the class described including type-selecting means, means to form a line from the selected type, printing means to print the set-up line, a type-conveying and distributing means adapted to receive the type in succession after printing, means to hold the type while printing, and means to automatically release the types from the holding means after printing, whereby the type in the printed line will be crowded out to the conveying means by the incoming type in the forming of a new line.

16. A machine of the class described including key-operated, type-selecting means, means to set up a line from the selected type, a stop at the far end of the line and movable into or out of a position extending into the line of type, line-printing means, and means to cause withdrawal of said stop from the line after printing.

17. A machine of the class described including key-operated, type-selecting means, means to set up a line from the selected type, a stop at the far end of the line and movable into or out of a position extending into the line of type, line-printing means, and means automatically operated by the printing means to cause withdrawal of said stop by the printing means on the return stroke of the latter.

18. A machine of the class described including key-operated type-selecting means, a form for setting up a line from the selected type, means receiving the selected type and acting to deliver the type to said form, latch means at the entrance end of the form to prevent retrograde movement of the type after delivery by the second means, and means to print from the type while in said form.

19. A machine of the class described including key-operated type-selecting means, a form for setting up a line from the selected type, means receiving the selected type and acting to deliver the type to said form, and latch means at the entrance end of the form to prevent retrograde movement of the type after delivery by the second means; together with a friction device adapted to bear against the type at that end of the form opposite the latch means, said friction device being yieldable to the movement of the advancing type for the discharge of the type under the pressure of the incoming type in forming a new line.

20. A machine for setting, printing and distributing type, means to set up a line of type, an elevator adapted to receive the type for distribution, means to cause the individual type being set up to effect successive discharges to the elevator of the previously set-up line of type a horizontal distributing means, and means to transfer the type from the elevator to said distributing means.

21. In a machine for setting, printing and distributing type, a distributing conveyor, a fixed structure past which said conveyor travels, wards on said fixed structure in approximately dove-tail form, and type having corresponding wards, said structure having various cut-outs to correspond with the wards of the individual types.

22. In a machine of the class described, a type elevator adapted to convey type in succession, a traveling distributing means above the upper end of the elevator and moving horizontally over points to which the type is to be distributed, and a rockable transfer device disposed beyond the upper end of the elevator and movable to a position in the plane of the path of movement of the type by the elevator and movable to a plane for the type raised by the transfer device to lie in the path of movement of the travelling distributing device.

23. A machine of the class described including printing means, a type elevator, a type distributing means, a rockable device to transfer the type from the elevator to the distributing means, a shaft mounting said rockable device, a pinion on said shaft, a reciprocating rack bar meshing with said pinion, and revolving means to operate said rack bar.

24. A machine of the class described including type-setting means, printing means to print a set-up line, an inking frame, inking rollers in said frame, the latter being movable over the type to ink the latter, a platen, and means to move the platen to the type after the inking movement of the inking rollers and before the return movement of the said rollers.

25. In a machine of the class described, a reciprocating frame, inking means carried by said frame, a printing platen movable to and from printing position, and means to tilt the frame upon its return stroke for clearing type.

26. In a machine of the class described, type-holding means, means to select type from said type-holding means, means to set up a line of the selected type, and means to print the set-up line in situ without shifting said set-up line.

27. In a machine of the class described, type-holding means, means to select type from said type-holding means, means to set up a line of the selected type, and means to print the set-up line in situ without shifting said set-up line; together with means to cause discharge of the type from the set-up line from the printing position in successive decrements.

28. In a machine of the class described, type-holding means, means to select type from said type-holding means, means to set up a line of the selected type, means to print the set-up line, type-distributing means, and means to cause discharge of the type in the set-up line from the printing position by successive decrements to the distributing means.

29. In a machine of the class described, type-holding means, means to select type from said type-holding means, means to set up a line of the selected type, means to print the set-up line, type-distributing means, and means to cause discharge of the type in the set-up line from the printing position by successive decrements to the distributing means, the said means to cause discharge of the type being subject to the movements of said printing means.

30. In a machine of the class described, means to set up a line of type, and means to discharge the set-up line by successive decrements.

31. In a machine of the class described, a form to receive type, means to set up a line of type in said form by successive feed increments of individual type, and means to cause the type fed by successive feed increments to cause discharge of decrements of the previously set-up line.

JOHN GALLOWAY.